March 26, 1968   J. H. FERGUS   3,374,779
ELECTRIC SYSTEM
Filed March 4, 1966
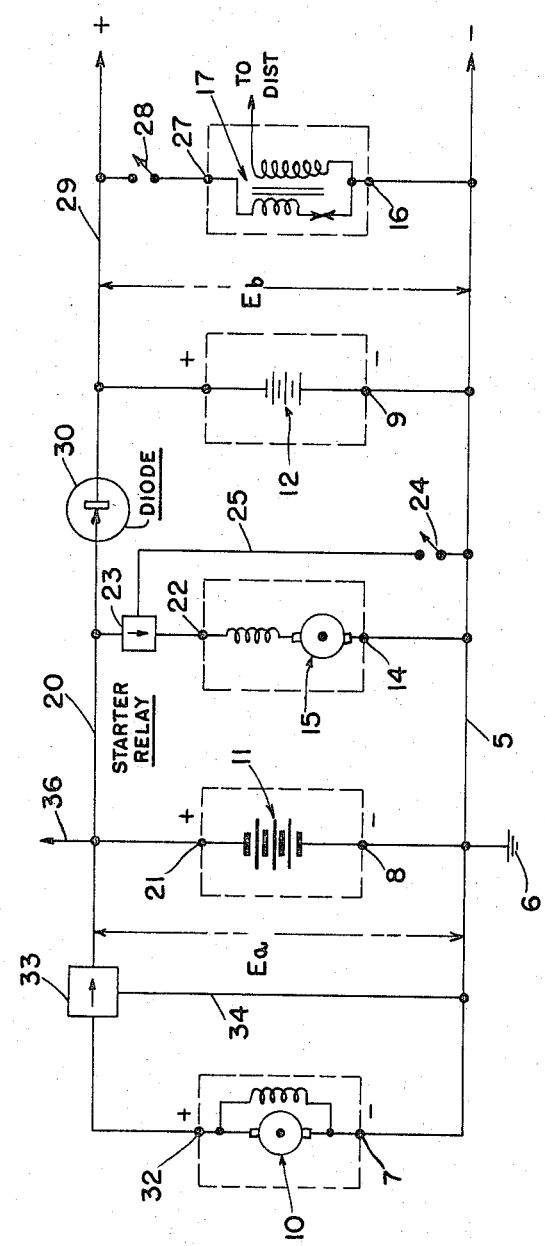
Inventor
JOHN H. FERGUS
By Harry M. Saragovitz
Edward J. Kelly, Herbert Berl
& S. Dubroff
Attorneys

United States Patent Office

3,374,779
Patented Mar. 26, 1968

3,374,779
ELECTRIC SYSTEM
John H. Fergus, Taylors Lane, Riverton, N.J. 08077
Filed Mar. 4, 1966, Ser. No. 534,291
2 Claims. (Cl. 123—179)

ABSTRACT OF THE DISCLOSURE

Automotive vehicular power supply system comprising a heavy-duty main battery, with means for charging it directly from the generator, and two supply leads directly connected therewith, one being a ground lead and the other being a high potential lead, and between which is maintained normally a predetermined voltage from the main battery as a current supply source for the system. An ignition circuit is connected between the supply leads to receive operating voltage therefrom in operation and is provided with a light-duty auxiliary battery connected directly with the ignition circuit for inclusion therewith. A diode rectifier is connected between the auxiliary battery and the remainder of the system exclusive of the ignition circuit and poled to prevent current flow from the auxiliary battery to the remainder of the system. When the supply voltage across the supply leads is too low for any reason, the auxiliary battery provides for supplying the ignition circuit which thus becomes isolated.

---

The invention described herein may be manufactured and used by or for the Government for governmental purposes without the payment to me of any royalty thereon.

The present invention relates to power supply circuits for automotive vehicles and the like, and more particularly to power supply circuits for military vehicles and like equipment requiring the power source adapted to supply two circuits, one of which provides a frequent heavy current drain or load, such as the starter circuit for example, and the other of which requires a constant full voltage with a lighter current drain or load. This may be the ignition circuit for example.

In general, military trucks automotive devices have an electrical system consisting of a charger, a battery, and an ignition system with other circuits lights etc., all normally designed for operation at a voltage of the same magnitude as the open-circuit voltage of the battery.

Under adverse operating conditions, such as low temperatures and/or with a discharge battery, the large current required by the starter results in the battery providing only a small fraction of its rated voltage. This reduced voltage is supplied to the ignition circuit with the result that a greatly reduced spark is provided for ignition of the charges in the cylinders of the engine. Under certain conditions ignition will not occur.

It is therefore a primary object of this invention to provide an improved electrical system or power supply circuit for automotive vehicles and the like which, because of reliability and effectiveness, is adapted for use in military vehicles and other equipment requiring a dependable source of power for starting and ignition purposes.

It is a further object of this invention to provide an improved power supply circuit for automotive vehicles and the like whereby an engine with a substantially dead battery can be started by hand cranking, and a faulty generator, or a short circuit in an auxiliary supply line effecting battery discharge will not prevent the system from supplying energy to an ignition system therein.

In accordance with the invention, a rectifier, such as a power transistor or other solid-state diode device, is connected between the main heavy-duty battery and a light-duty auxiliary battery which may be relatively small and of low cost, adapted merely to provide energy for the ignition system during starting. The rectifier is poled in the direction of flow of energy or charging current from the main battery to the auxiliary battery, and thus prevents discharge in the opposite direction of the auxiliary battery. The auxiliary battery is then a floating power source for the ignition system and is normally at the open-circuit potential of the main battery.

When a heavy load or substantially a short circuit such as an engine starting motor is connected to the main battery and the potential drops, the rectifier prevents the flow of energy from the auxiliary battery to the main battery. The ignition circuit is then provided with the rated voltage by the auxiliary battery. When the engine is started and the heavy load of the starter is disconnected, the main battery is charged by the vehicle power supply unit which is a generator or alternator. When it is charged to its rated voltage, it then provides energy to the ignition circuit and for keeping the auxiliary battery fully charged.

The invention will further be understood from the following description when considered with reference to the accompanying drawing, and its scope is pointed out in the appended claims.

In the drawing, the single figure is a schematic circuit diagram of an improved electrical power supply system for automotive vehicles and the like in accordance with the invention, and referring thereto, a common ground lead for all circuits of the vehicle is indicated as 5 and is connected to the chassis ground as indicated at 6. To this ground lead or to ground are connected the negative terminals 7, 8, and 9 of power source or generator 10, a heavy-duty main battery 11, and a light-duty auxiliary battery 12. Also connected to the ground or ground lead 5 is the ground terminal 14 of a starter motor 15 which is a main heavy load for the system, and the ground terminal 16 of the ignition system 17 which provides a relatively light load and is of the timer and transformer conventional type by way of example.

The high potential or ungrounded lead of the system is represented by the power supply lead 20 to which the positive terminal 21 of the main heavy-duty battery 11 is connected. Also connected to the positive supply lead 20 is the starter motor 15, which is of the series type as indicated, with a high potential terminal 22 connected to the lead 20 through a starter relay 23. The relay is energized by a starter switch 24 through a connecting lead 25 to close its contacts and pass current in the direction of the arrow.

The ignition system 17 is connected at its high-potential supply terminal 27 through an ignition switch 28 to a continuation 29 of the lead 20. The two leads are connected through a heavy duty diode or rectifier device 30 which may be of the power transistor type, poled as indicated to pass current in the direction of the auxiliary battery 12 from the main battery 11 and to prevent current flow from the battery 12 in the opposite direction. Thus the ignition system and the auxiliary battery are isolated from the main circuits of the main battery and the starter through the diode and may operate independently thereof to provide reliable ignition supply under adverse circumstances as will be seen hereinafter.

The main battery 11 is charged in the usual manner from any suitable power supply source such as the generator 10, the positive terminal 32 of which is connected through the usual voltage regulator 33 to the lead 20. The voltage regulator is provided with the voltage supply lead 34 connected to the negative lead 5. Thus upon the generator or power source providing a voltage relatively higher than that of the battery 11, a charge is delivered to the battery from the generator through the relay in the direction of the arrow, as it is understood. The voltage of the main battery 11 between the leads 20 and 5 is indicated as E$a$, while the voltage across the auxiliary battery 12 and the ignition system 17, that is, between the leads 29 and 5, is indicated as E$b$.

The operation of the system is as follows: the power rectifier or diode 30 provides a current-conducting or current-preventing connection between the two batteries in such a manner that energy from the vehicle power supply source or generator 10 and the battery 11 or other power input can only flow to the battery 12 while the battery 12 cannot discharge back into the battery 11 or the power supply source. The battery 12 thus is a floating power source for the ignition system 17 and normally is at the open circuit potential of the battery 11.

When a heavy load, such as the starting motor 15 upon closure of the switch 24 and the starter relay 23, is thus connected to the main battery 11, the output potential of the latter falls below its rated voltage. However, the rectifier or diode 30 inhibits the flow of energy from the battery 12 to the battery 11, and the ignition circuit 17 is provided with the rated voltage by the battery 12. After the motor has started and the circuits of the starter 15 is disconnected, the battery 11 can then be charged by the power supply source or generator 10 to its rated voltage, and it can then also provide energy to the ignition circuit 17 and for keeping the battery 12 fully charged.

Thus under adverse operating conditions as hereinbefore referred to, the large current required by the starter may result in the main battery 11 providing only a small fraction of its rated voltage. This reduced voltage normally is supplied to the ignition circuit with the result that a greatly reduced spark is provided for ignition or may even be too low to cause ignition at all. With the present improved circuit, however, the small and low-cost auxiliary battery 12 is free to energize the ignition system to full voltage under such conditions and others where the main battery is not in operating condition for some reason.

Among the advantages of this improved system are:

(1) An automotive engine with a disabled battery can easily be started by hand cranking because the ignition receives a full spark and energy to start.

(2) An engine driven stand-by or emergency power supply unit for field radar equipment and the like when provided with a circuit of this type can be started normally as the battery 12 will provide for ignition.

(3) A faulty generator, or a short circuit in an auxiliary supply circuit such as indicated at 36 might discharge the battery 11. However, the battery 12 will continue to supply power to the ignition system 17.

From the foregoing description, it will be seen that the improved electrical supply system of the present invention is of particular advantage in military vehicles and the like where a standby source of energy is required in emergencies and where adverse starting conditions are often encountered in the field.

I claim:

1. An improved electrical power supply system for automotive vehicles and the like for starting under adverse operating conditions, comprising in combination, a main heavy-duty battery adapted to provide operating current to a heavy load, generator means connected for charging said battery, a ground lead and a high-potential lead for the system between which is maintained normally a predetermined voltage by direct connection with said main battery as a current supply source for said system, an ignition system connected between said leads to receive operating current therefrom, a light-duty auxiliary battery of said predetermined voltage connected between said leads adjacent to said ignition system for inclusion directly in circuit therewith, and a diode element connected between said auxiliary battery and the remainder of the supply system and poled in a direction to prevent the flow of current from said auxiliary battery to said remainder of the supply system in response to an overload on the main battery through said leads and a drop in the main battery voltage below said predetermined voltage.

2. An improved electrical supply system for automotive vehicles and the like as defined in claim 1, wherein the heavy load for the main battery is a starting motor for an internal-combustion engine, and wherein the source of charging current for the main battery and operating current to the remainder of the supply system, and to the ignition system through said diode is the main generator of the vehicle.

References Cited
UNITED STATES PATENTS

| | | | |
|---|---|---|---|
| 1,288,938 | 12/1918 | Leonard | 290—37 |
| 1,873,117 | 8/1932 | Fitzsimmons. | |
| 2,138,160 | 11/1938 | Hansell | 320—53 XR |

LAURENCE M. GOODRIDGE, *Primary Examiner.*